March 15, 1966     E. S. McVEY     3,241,049
VOLTAGE REGULATOR
Filed March 29, 1962     2 Sheets-Sheet 1

INVENTOR.
EUGENE S. McVEY
BY
Oberlin, Maky & Donnelly
ATTORNEYS

March 15, 1966    E. S. McVEY    3,241,049
VOLTAGE REGULATOR

Filed March 29, 1962    2 Sheets-Sheet 2

INVENTOR.
EUGENE S. McVEY
BY
Oberlin, Maky & Donnelly
ATTORNEYS

United States Patent Office 3,241,049
Patented Mar. 15, 1966

3,241,049
VOLTAGE REGULATOR
Eugene S. McVey, Charlottesville, Va., assignor to Elgin Electronics Incorporated, a corporation of Ohio
Filed Mar. 29, 1962, Ser. No. 183,642
11 Claims. (Cl. 323—45)

This invention relates, as indicated, to voltage regulators, and, more particularly, to an improved alternating current electronic regulator.

The basic function of such a regulator is, of course, to maintain the output voltage of a supply constant, notwithstanding changes in the load current drawn from the supply and changes in the input voltage. The voltage from the regulator is sensed and compared by appropriate energy manipulation with a fixed reference; and difference resulting from such comparison produces an error signal. Such error signal is converted to a proportional alternating current signal and the latter is amplified and applied to aid or oppose the incoming power in order to provide the desired constant voltage output.

The efficiency of such regulation is determined by such factors as the accuracy, stability, sensitivity and speed of response of the device employed for the purpose, but although these considerations are well known and different types of alternating current regulators have been proposed and supplied with such characteristics in mind, those with which I am familiar do not, in fact, provide more than holding the output voltage within given, and not particularly small, tolerances. While the electronic regulator has the advantage, as compared to other types, of substantially greater power capacity, it has thus heretofore been limited by its lack of accuracy and speed of response, and it is accordingly a principal object of the invention to provide a new electronic regulator which will perform much better in these important respects.

Another object of the invention is to provide such a regulator having a harmonic rejection feature which suppresses the undesirable components of the input power and is therefore capable of use in systems requiring a relatively pure sinusoidal source. It has for example, been a necessary practice of manufacturers of calibration equipment to use separate power sources when calibrating R.M.S., peak-to-peak, or average value meters because of distortion; with the regulator of the invention it has become possible to calibrate any type of meter with a single power supply because of the nearly-perfect sine wave available.

Another object is to provide a regulator which will permit operation over a wide input frequency range by simple and readily accomplished substitution in one section of the regulator, thereby obviating the need for a separate power supply for each frequency which has been the practice heretofore. The regulator is, moreover, operable without such a section, which adds harmonic rejection, with variable input frequency, if desired.

It is also an object of the invention to provide an accurate and quickly responsive electronic regulator having an extremely wide power handling capability.

Another object is to provide in such a regulator a modulator of improved stability, with such modulator having an output containing only carrier and side-band components proportional to the incoming signal, for example, from the comparison circuit of the regulator.

Other objects and advantages of the present invention will become apparent as the following description proceeds.

To the accomplishment of the foregoing and related end, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
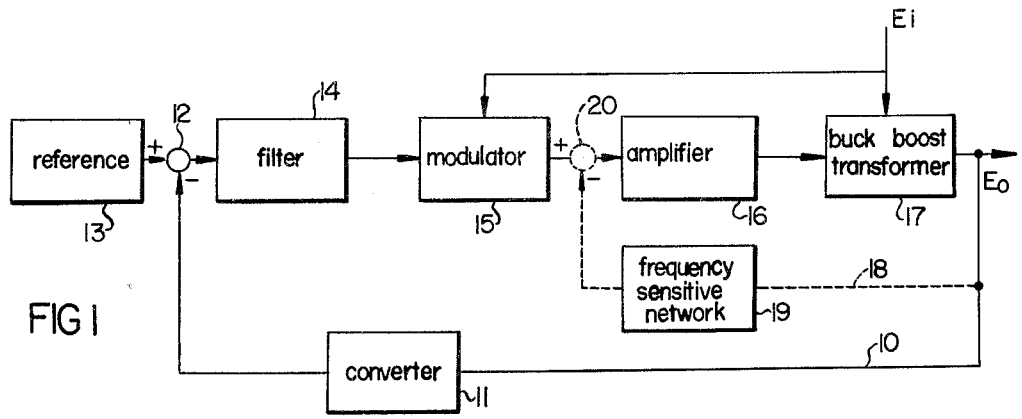
FIG. 1 is a block diagram of the major sections of an electronic regulator in accordance with the present invention.

Referring now to the drawings in detail, the general nature and mode of operation of the new regulator will be apparent from a consideration of the block diagram shown in FIG. 1, which E$i$, of course, indicates the alternating current input voltage to the regulator from the power supply and E$o$ is the output voltage to the particular load. As shown by the line 10, the output voltage of the regulator is applied to the converter 11 which provides a signal proportional to E$o$ and this signal is applied to a perfect adder 12 known per se. The latter also receives a reference voltage from a fixed source 13, and the difference signal is passed through an equalizer and filter 14 to a modulator 15.

The error signal produced by the comparison of the output voltage and the fixed reference is converted into an alternating current signal in the modulator, and this last signal is amplified as indicated by the amplifier 16 and applied to a buck-boost transformer 17 in which it either adds or opposes the incoming power as needed to cause the output voltage to remain constant.

This regulator can include a frequency sensitive network as indicated by the dashed line 18 and the block 19 operated by E$o$ with its output introduced into the amplifier 16 after being combined with the output of the modulator 15, at a further adder 20. This network limits operation to a single frequency, however, if desired, it will be understood that a different network can be substituted to change such operating frequency. Without this network, incoming power of variable frequency can be regulated.

Figure 2:
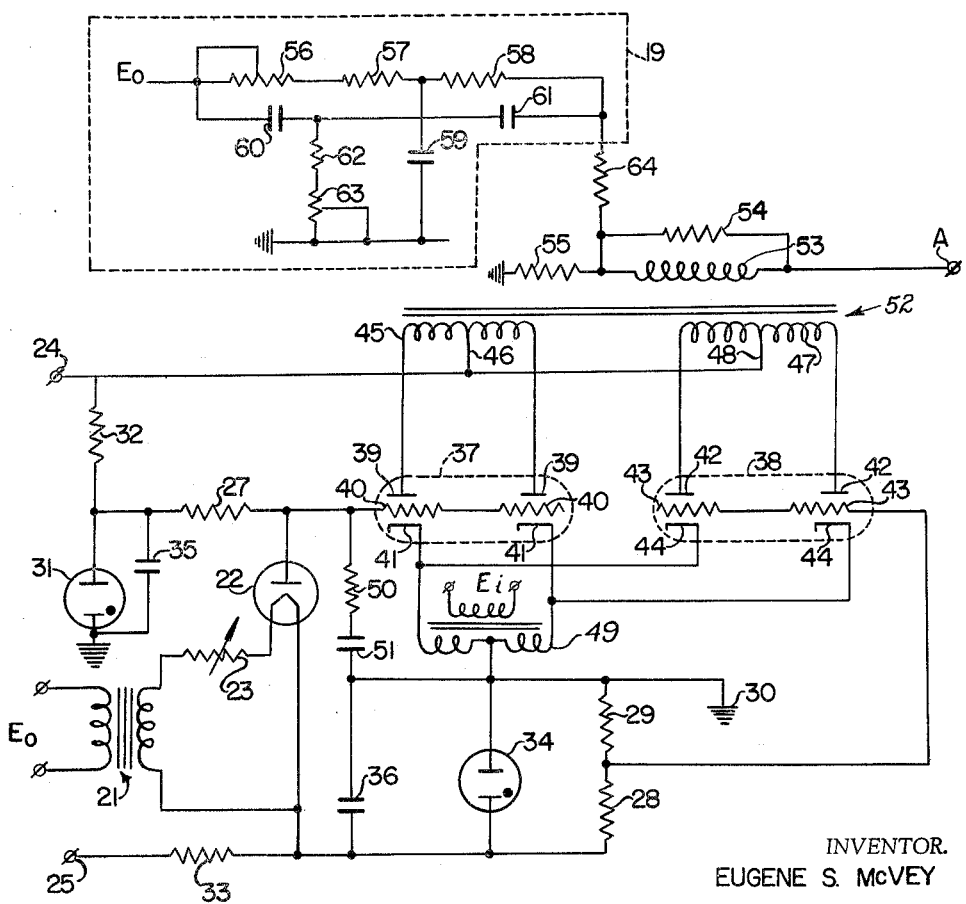
FIG. 2 is a wiring diagram of the control section of said regulator.

In the detailed circuit of FIG. 2, the alternating current output voltage of the regulator E$o$ is thus reduced in magnitude by a transformer 21 and fed to the heater of a vacuum diode 22 the heating element temperature of which is proportional to the applied voltage. Since the current from the heater to the plate of this diode is proportional to the temperature of the former, a change in E$o$ results in a corresponding change in current conducted by the diode. A variable resistor 23 in its heater circuit permits adjustment of the magnitude of the output voltage signal. By feeding back a voltage proportional to an output current into 21, the regulator serves as a current regulator as is well known to those versed in the art.

Power is applied to the control section at the terminals 24 and 25, with the former relatively positive, and the diode 22 is connected thereacross with resistor 27 in its plate circuit and series connected resistors 28 and 29 in a heater circuit to ground, shown at 30. A voltage regulating glow tube 31 is connected between the end of resistor 27 remote from the diode and ground, with the circuit to terminal 24 completed through a series resistor 32 commonly from glow tube 31 and resistor 27. The diode heater circuit also has a connection to terminal 25 through resistor 33, and another glow tube 34 is connected across resistors 28 and 29. Capacitors 35 and 36 are respectively in parallel with the glow tubes 31 and 34 as shown.

It will thus be apparent that the voltage drop across resistor 27 will vary only with changes in current flow through the diode and, therefore, that any such voltage variation will be proportional to changes in $Eo$ or the voltage output of the regulator.

Two dual triode vacuum tubes 37 and 38 are employed, with triode 37 having plates 39, grids 40, and cathodes 41, and triode 38 having plates 42, grids 43 and cathodes 44. Plates 39 of triode 37 are connected respectively to opposite ends of a primary transformer winding 45 having a center tap connection 46 to the power source at the terminal 24, and the plates 42 of triode 38 are similarly connected to a further primary winding 47 of the same transformer with a corresponding center tap source connection 48. The cathodes 41 and 44 of the two tubes are connected in push-pull parallel as shown and driven by $Ei$ through a transformer, the secondary winding of which is shown at 49. Such winding 49 has a center tap connected to ground as indicated at 30, and resistor 50 and capacitor 51 are connected in series between the grids and cathodes of triode 37.

The grids 40 of triode 37 are connected in series, with an external connection to resistor 27, while grids 43 of triode 38 are also tied together with an external connection between resistors 28 and 29. Accordingly, any change in the voltage across resistor 27 is applied to the grids of triode 37, whereas the grids of triode 38 are held at constant potential as established by resistors 28 and 29 and glow tube 34.

The output transformer 52 of the modulator, having the earlier mentioned primary windings 45 and 47, includes a secondary winding 53 across which a loading resistor 54 is connected for reduced sensitivity to frequency and component variations. Such secondary is connected at one end through resistor 55 to ground, and the other end terminal A is adapted for connection to the amplifier designated by reference number 16 in the FIG. 1 block diagram.

With respect to the operation of the circuit described above in detail, it will be seen that the triodes 37 and 38 are driven in push-pull parallel at the cathodes, with, however, the two sections of each tied together at the grid and the signal driving the cathodes obtained from the power from the input, $Ei$. Any variation of the alternating current signal produced by triode 38 will be due only to changes in the incoming power level and of no consequence, but the signal produced by triode 37 is proportional to the grid voltage thereof. Since the outputs of the two tubes are applied to the same transformer 52, the only signal at the secondary of the same is the difference between such tube output signals. This difference signal at the output transformer secondary will be proportional to the error signal from the comparison circuit which depends, as earlier explained, on the difference between $Eo$ and the fixed reference voltage. The output transformer secondary voltage varies in magnitude and shifts in phase by 180° as required to maintain $Eo$ constant, such difference signal being amplified and delivered to the buck-boost transformer 17 to aid or oppose the incoming power.

The described push-pull arrangement of course serves to reduce second and other even harmonics, which is highly desirable to avoid corruption of the error signal from the modulator and hence distortion in $Eo$ on such account. Since the two grids 40 of the modulator tube 37 are tied together and thus move relative to ground potential by the same amount, the instantaneous current change is equal in both sections and any distortion cancelled out in the interconnected transformer winding. This action provides the extremely important feature of decoupling an undesired feed-back loop around the total system, whereby high loop gain is provided. Moreover, the modulator comprising the tubes 37 and 38 and directly associated components is nearly perfect in that its output contains only carrier and side-band components proportional to the incoming signal from the comparison circuit. That is, the two triode sections of such a push-pull arrangement operate similarly as to any drive signal distortion through to the grids and the effects are cancelled out in the opposed sections of the output transformer winding to which the outputs from the sections are applied.

Such operation is in distinct contrast to other modulators lacking such a fundamental rejection feature and amplifying the incoming signal as well as performing modulation, and it is such "feed-through" effect in conventional modulators which causes serious stability problems.

The FIG. 2 circuit also includes as an optional feature a harmonic rejection circuit shown within the dashed outline frequency sensitive network block 19 in FIG. 1. Such added circuit is in the form of a parallel T network, comprising series connected resistors 56, 57 and 58, with a capacitor 59 to ground intermediate resistors 57 and 58, and the parallel circuit comprising series connected capacitors 60 and 61 with an intermediate ground connection including resistors 62 and 63. This network is well-known per se and is effective to reject the fundamental frequency to greater extent than harmonic frequencies. With proper phasing, $Eo$ being applied to the network here, the harmonics are inserted into the control section output signal by resistor 64 and the aforesaid resistor 55, so that they will be amplified in the power amplifier and used to reject harmonics existing in $Eo$. Harmonics can be rejected in this manner to any degree desired, and when the system is to operate at a different frequency, another such rejection network tuned to the particular new frequency can readily be substituted.

Figure 3:
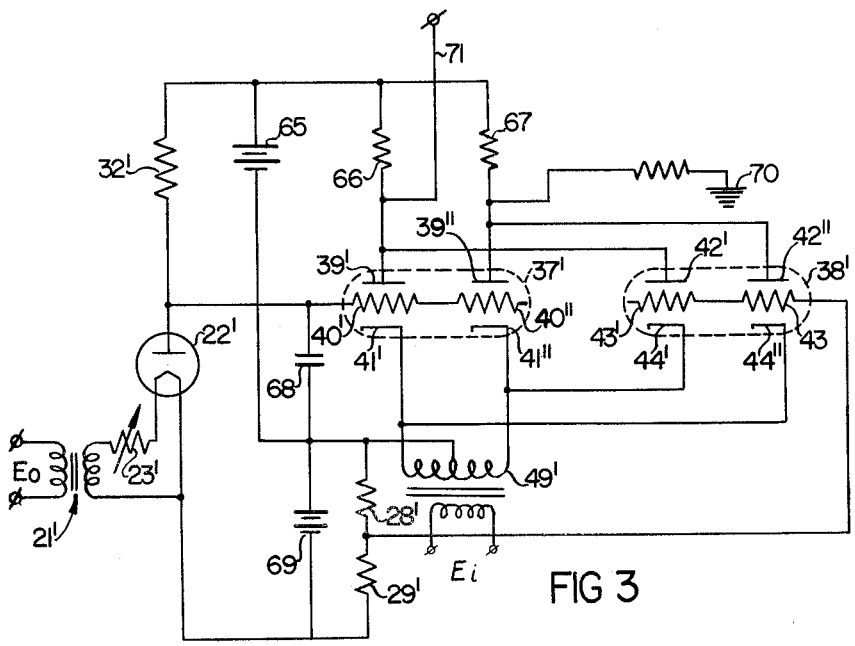
FIG. 3 is a partly modified circuit for such control section.

In the modification shown in FIG. 3, wherein previously described components have corresponding primed reference numerals, the output signals of the modulator tubes are added in a different manner. The power supply for the tubes is more simply represented by the battery 65, the positive side of which is connected through a resistor 66 to corresponding plates 39' and 42' of the triodes 37' and 38' and through a further resistor 67, in parallel with 66, to the remaining corresponding plates 39" and 42" here double primed for such distinctive relation to the two plate resistors. The cathodes are similarly distinguished as 41' in parallel with 44" and 41" in parallel with 44', and the same connotation is applied to the grids. A compensating and filtering capacitor 68 is connected between the grid and cathode circuits of tube 37', and a further battery 69 is shown across the resistors 28' and 29' for providing the constant bias to the grids of the tube 38' and to establish the proper voltage level for the operation of 22'. The diode 22' will function to determine the grid voltage of tube 37' in the same manner set forth in the description of the FIG. 2 control section.

In this arrangement, the resistors 66 and 67 are thus shared by the two tubes, with resistor 66 conducting the direct and alternating current of both the primed element sections of the tubes and resistor 67 similarly related to the double primed component sections of the tubes. The alternating currents from each push-pull triode pair through the resistors are out of phase and, accordingly, the alternating current voltage across resistor 66 is due to the difference of the signals produced by the connected tube sections. The resulting signal depends in magnitude and phase on the grid input to the tube 37', since the grids of 38' are at a fixed potential.

By providing a signal ground, as shown at 70, for the plate 39" and taking the output signal of the modulator from the plate 39', through the wire 71, the net alternating current voltages across resistors 66 and 67 are added in phase for the fundamental component. However, the even harmonics are cancelled out, and the circuit affords the same anti-distortion advantage as a transformer output push-pull arrangement. A separate harmonic rejection circuit can be added as and for the purpose set forth in connection with the prior description of the network designated generally by reference numeral 19.

The modified FIG. 3 control section provides an improved frequency response, without the inherent limitations of an output transformer and introduction by the latter of a relatively large third harmonic due to its non-linear magnetic core characteristic. It will also be appreciated that elimination of the transformer will reduce the system cost and the weight and space requirements.

Figure 4:
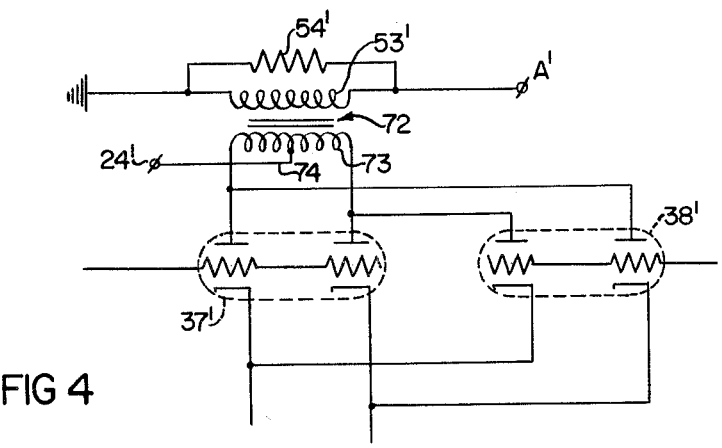
FIG. 4 shows another circuit modification.

With further regard to simplification of the FIG. 2 modulator, some savings can be effected by the modification shown in FIG. 4 in which a different output transformer 72 is employed having a single primary winding 73. The plates of the two tubes are connected in parallel to the ends of such primary as illustrated, with a center tap 74, and the currents of the tubes are thus added in the same winding. The transformer cost is somewhat reduced and some further advantage is realized by the fact that tube plate impedances are identical.

It will of course be understood that transistors and other active devices equivalent to the vacuum tubes described herein can be employed for the latter.

Other modes of applying the principle of the invention may be employed, change being made as regards the details described, provided the features stated in any of the following claims or the equivalent of such be employed.

I, therefore, particularly point out and distinctly claim as my invention:

1. In an alternating current voltage regulator, means for producing a direct current error signal proportional to change in the output voltage of an alternating current supply, modulator means for converting said error signal to an alternating current difference signal which can be applied for the purpose of opposing the change in the supply output voltage, said modulator means comprising first and second push-pull triode circuits, means for driving both said circuits by said alternating current supply, means for applying a constant potential to both grids of said first push-pull circuit, means for applying the error signal similarly to both grids of the second push-pull circuit, and means for combining the output signals of the two circuits to produce said difference signal.

2. In an alternating current voltage regulator, means for producing a direct current error signal proportional to change in the output voltage of an alternating current supply, modulator means for converting said error signal to an alternating current difference signal which can be applied for the purpose of opposing the change in the supply output voltage, said modulator means comprising a first circuit having pair of triodes with the cathodes thereof connected in push-pull and a second circuit with a pair of triodes similarly connected in push-pull at the cathodes, means for driving the cathodes of both said circuits by said alternating current supply, means for applying a constant potential to both grids of said first circuit, means for applying said error signal similarly to both grids of the second circuit, and impedance means in which the output signals of the two circuits are developed and combined to produce said difference signal.

3. A regulator as set forth in claim 2 wherein the cathodes of the two push-pull triode circuits are connected in parallel to a common input transformer winding.

4. A regulator as set forth in claim 2 wherein the two grids of each push-pull triode circuit are directly interconnected.

5. A regulator as set forth in claim 2 including a frequency sensitive means for inserting harmonics of said output voltage into the difference signal produced by the modulator means.

6. In an alternating current voltage regulator, means for producing a direct current error signal proportional to change in the output voltage of an alternating current supply, modulator means for converting said error signal to an alternating current difference signal which can be applied for the purpose of opposing the change in the supply output voltage, said modulator means comprising first and second push-pull triode circuits with the cathodes thereof connected in push-pull parallel, means for driving the cathodes of said circuits from said alternating current supply, means for applying a constant potential to both grids of said first push-pull circuit, means for applying the error signal similarly to both grids of the second push-pull circuit, and output transformer primary winding means in which the output signals of the two circuits are developed and combined to produce said difference signal.

7. A regulator as set forth in claim 6 wherein said primary winding means comprises a winding common to both circuits.

8. In an alternating current voltage regulator, means for producing a direct current error signal proportional to change in the output voltage of an alternating current supply, modulator means for converting said error signal to an alternating current difference signal which can be applied for the purpose of opposing the change in the supply output voltage, said modulator means comprising first and second push-pull triode circuits, with the cathodes thereof connected in push-pull parallel, means for driving the cathodes of said circuits from said alternating current supply, means for applying a constant potential to both grids of said first push-pull circuits, means for applying the error signal similarly to both grids of the second push-pull circuit, the plates of said circuits being paired in parallel respectively with first and second load resistances, and means for adding the output signals across said load resistances to provide said difference signal.

9. A regulator as set forth in claim 8 wherein the grids of each push-pull circuit are directly interconnected.

10. In a control section as described, modulator means comprising a first pair of triodes having their cathodes connected in push-pull through a tapped transformer winding, the grids of said first pair of triodes being substantially directly interconnected, means for driving the cathodes of said first triode pair with an alternating current supply through said tapped winding, means for applying a variable direct current signal simultaneously and in the same manner to the interconnected grids of the first triode pair in the normal operation of the modulator means for similar driving of the first triode pair grids by the same manner to the interconnected grids of the first spective plate circuits of the first pair of triodes, whereby drive signal distortion of the first triode pair grids is canceled in said opposed transformer windings, a second pair of triodes having their cathodes similarly connected in push-pull through said tapped winding and in parallel with the cathodes of said first triode pair to be driven in the same manner as the latter, means for applying the same constant potential to both grids of the second triode pair, further opposed transformer windings respectively in the plate circuits of the triodes of said second pair, and a common secondary winding coupled with the several plate circuit windings to form an output transformer therewith.

11. In a control section as described, modulator means comprising a first pair of triodes having their cathodes connected in push-pull through a tapped winding, the grids of said first pair of triodes being substantially directly interconnected, means for driving the cathodes of the first triode pair with an alternating current supply through said tapped winding, means for applying a variable direct current signal simultaneously and in the same manner to the interconnected grids of the first triode pair in the normal operation of the modulator means for similar driving of the first triode pair grids by the same signal, opposed transformer windings in the respective plate circuits of the first pair of triodes, whereby drive signal distortion of the grids of the first triode pair is cancelled in such opposed transformer windings, a second pair of triodes having their cathodes similarly connected in push-pull through said tapped winding and in parallel with the cathodes of the first triode pair to be driven in the same manner, means for applying the same constant potential to both grids of the second triode pair, and means connecting the plates of the second triode pair in parallel with those of the first triode pair and hence also to said opposed transformer windings.

References Cited by the Examiner

UNITED STATES PATENTS

| | | | |
|---|---|---|---|
| 2,442,786 | 6/1948 | Somers | 323—32 X |
| 2,450,445 | 10/1948 | Rosencrans | 332—43 X |
| 2,642,558 | 6/1953 | Terry et al. | 321—18 |
| 2,695,980 | 11/1954 | Leed et al. | 321—35 X |
| 2,711,512 | 6/1955 | Rockwell | 332—43 |
| 2,966,636 | 12/1960 | Rockwell | 332—60 |

LLOYD McCOLLUM, *Primary Examiner.*